H. S. GINGRICH.
TABLE LEG FASTENER.
APPLICATION FILED JULY 29, 1908.
918,665. Patented Apr. 20, 1909.
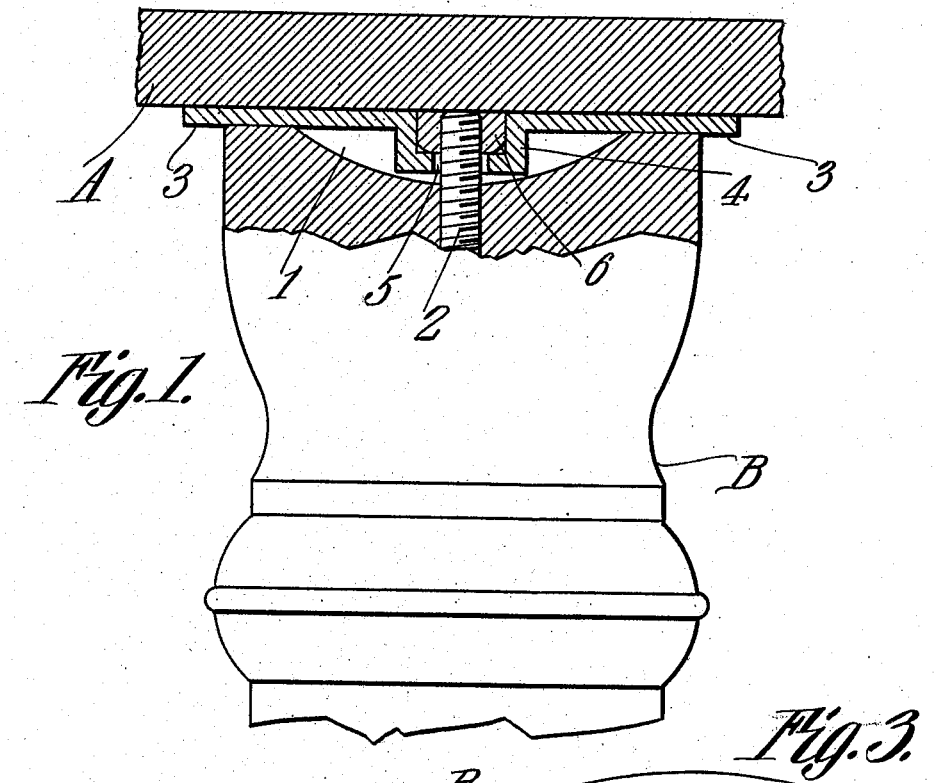
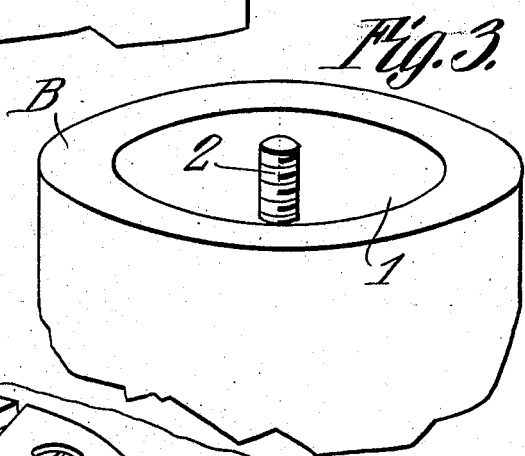
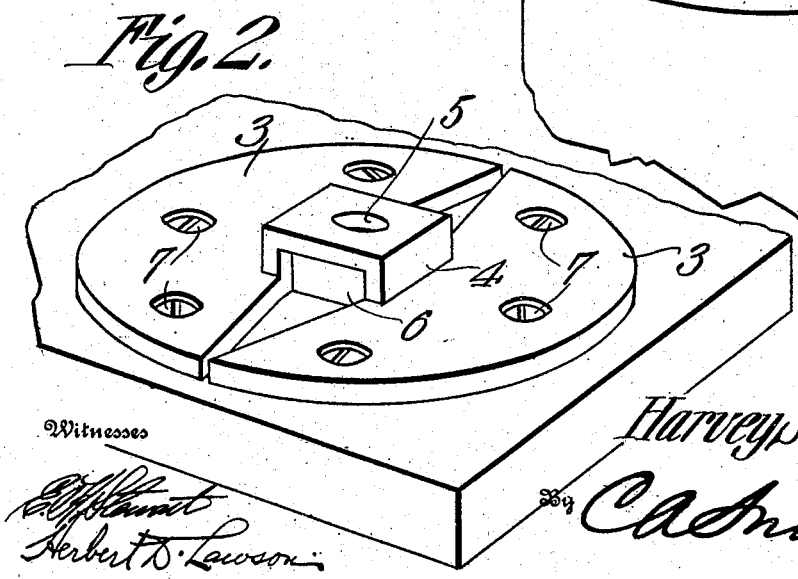
Inventor
Harvey S. Gingrich.

UNITED STATES PATENT OFFICE.

HARVEY S. GINGRICH, OF PINE BLUFF, ARKANSAS.

TABLE-LEG FASTENER.

No. 918,665.  Specification of Letters Patent.  Patented April 20, 1909.

Application filed July 29, 1908. Serial No. 445,984.

*To all whom it may concern:*

Be it known that I, HARVEY S. GINGRICH, a citizen of the United States, residing at Pine Bluff, in the county of Jefferson and State of Arkansas, have invented a new and useful Table-Leg Fastener, of which the following is a specification.

This invention relates to fasteners and is particularly designed for securing legs to extension tables and similar articles of furniture.

The object of the invention is to provide a simple form of fastener which can be readily attached to a table top and which, though simple and inexpensive in construction will operate to securely attach a table leg, the fastener being practically invisible.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a vertical transverse section through a portion of a table leg and through the fastener connecting the same. Fig. 2 is a perspective view of the main member of the fastener. Fig. 3 is a perspective view of the upper portion of a leg containing the other member of the fastener.

Referring to the figures by characters of reference, A designates a table top and B designates a table leg, said leg having its upper end provided with a concavity 1 from the center of which extends a screw 2 which projects a short distance beyond the plane occupied by the leg. This screw constitutes one of the members of the fastener. The other member of the fastener is shown in detail in Fig. 2 and consists of oppositely disposed substantially semi-circular plates 3 spaced apart throughout their lengths and connected together at the centers of their adjoining edges by means of an integral bridge 4 having a central opening 5. This bridge is designed to straddle a nut 6 which is loosely mounted between the plates 3 and has a threaded opening therein for the reception of the screw 2.

The plates 3 are designed to be fastened to the table top A or to any other structure to be supported, by means of screws 7 or other suitable devices, the nut 6 being first inserted between the plates 3 and within the bridge 4. The leg B is then placed beneath the table top and the screw 2 inserted into opening 5 and then screwed into the opening and the nut 6. This will cause the leg to be drawn tightly against the plates 3 with bridge 4 located within the recess 1. The leg will therefore tightly clamp upon the plates 3 which will form an unyielding bearing for the leg. It will be seen that the only portion of the fastener remaining visible after the leg has been secured in place is the marginal portion of each plate 3, and obviously if desired these plates can be made of such size as to rest with their marginal portions flush with the peripheral portion of the leg.

What is claimed is:

1. A fastener comprising an angular bridging portion, similar plates extending in opposite directions from opposite portions of the bridging member and integral therewith, said bridging member extending beyond one face of the plates and having an opening therein, the adjacent edges of the plates converging at opposite sides of the bridging member, a nut detachably seated within the bridging member and having its opening registering with the opening in the said member, the converging edges of the plates constituting means for preventing movement of the nut in opposite directions, and a threaded member insertible into the bridging member and into the nut retained thereby.

2. A fastener comprising oppositely disposed plates having their adjacent edges converging from their centers toward their ends, and a bridging device connecting the middle portions of the said edges and outstanding from the plates and integral therewith, said bridging member having a central opening therein, a nut detachably seated within the bridging member and held against displacement in opposite directions by the converging edge portions of the plates, a structure to which the plates are fastened, said structure constituting a backing for the bridging portion, a second structure having a concavity therein, and a screw threaded fastener member centrally disposed within the concavity and insertible into the bridging portion and into the nut retained thereby.

In testimony that I claim the foregoing as my own, I have hereto affixed my signature in the presence of two witnesses.

HARVEY S. GINGRICH.

Witnesses:
J. W. LANGFORD,
V. O. BUCK.